March 28, 1939.  H. W. PRICE ET AL  2,152,087
POWER CLUTCH AND BRAKE CONTROL
Filed Sept. 26, 1935
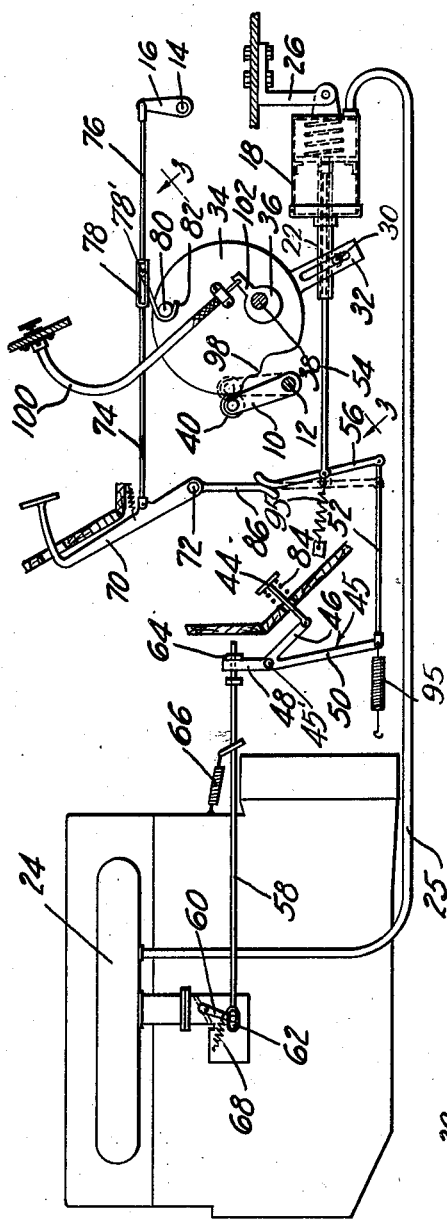
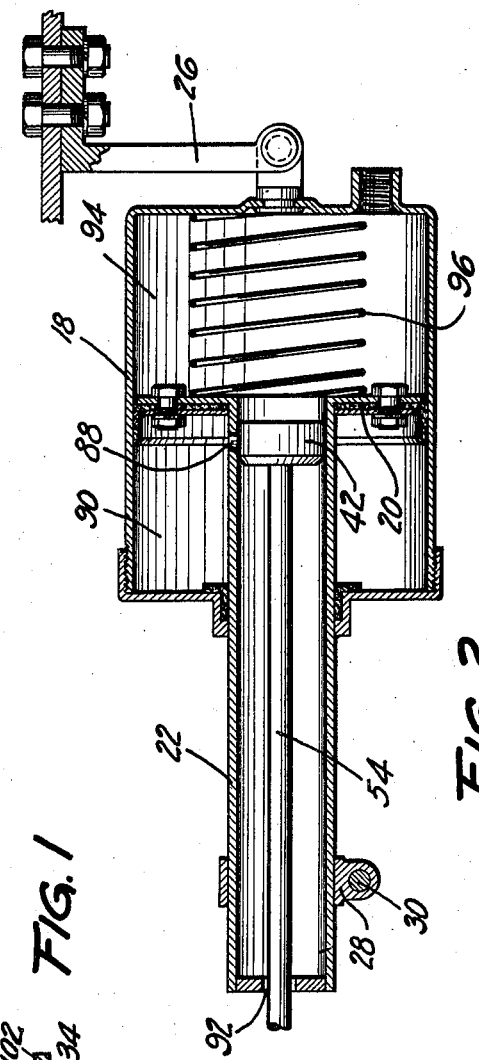
INVENTOR.
HAROLD W. PRICE
OTTO CAPRA
EARL R. PRICE
BY H. O. Clayton
ATTORNEY Patented Mar. 28, 1939

2,152,087

UNITED STATES PATENT OFFICE 2,152,087

POWER CLUTCH AND BRAKE CONTROL

Harold W. Price, Otto Capra, and Earl R. Price, South Bend, Ind., assignors to Bendix Products Corporation, South Bend, Ind., a corporation of Indiana Application September 26, 1935, Serial No. 42,194

6 Claims. (Cl. 192—.01)

This invention relates to power mechanism for operating the brakes and clutch of an automotive vehicle and more particularly to a pressure differential operated type of power mechanism, the source of power being the intake manifold of the internal-combustion engine.

An object of the invention is to provide an efficient and compact power mechanism employing a single power actuator, the power element of said actuator being operably connected to the clutch and brakes of the vehicle, said actuator being controlled in part by the brake pedal and in part by the accelerator of the vehicle.

A further object of the invention is to provide a power means for operating the clutch and brakes of the vehicle, wherein a single power actuator, preferably of the vacuum suspended type, is controlled both by an accelerator and by a brake pedal to provide a follow-up control of the actuator to operate the brakes and clutch.

Yet another object of the invention is to provide a simple, inexpensive type of power means employing a single cylinder and a power element reciprocable within said cylinder, said power element being operably connected to the brakes and clutch by a camming mechanism, said mechanism being so contoured and otherwise constructed as to provide for a variable engagement control of the clutch and a release of the brakes prior to said engagement of the clutch.

Yet another object of the invention is to provide a power means for operating the brakes and clutch, said means being controlled by the accelerator and brake pedal, whereby upon release of the accelerator the clutch is disengaged, the brakes then being applied progressively, depending upon the position of the brake pedal as the same is depressed.

In brief, the object of the invention in its broadest aspect is to provide a power means for operating the brakes and clutch of an automotive vehicle in such fashion as to fully simulate a conventional manual control of the brakes and clutch by the conventional brake and clutch pedals.

Other objects of the invention and desirable details of construction and combinations of parts will become apparent from the following detailed description of a preferred embodiment of the invention taken in conjunction with the accompanying drawing, in which:

Figure 1 is a diagrammatic disclosure of the clutch and brake operating power mechanism of our invention;

Figure 2 is an enlarged sectional view of the vacuum suspended power actuator of the power mechanism of Figure 1; and Figure 3 is a view disclosing in detail the cam and eccentric of the clutch and brake operating means of Figure 1.

Referring now to Figure 1, there is disclosed a crank 10 operably connected, through the medium of a clutch throw-out shaft 12, to a conventional clutch, not shown; there is also disclosed a brake operating cross shaft 14 operable by a crank 16.

The invention is directed to a single power means for operating both the clutch and the brakes of the vehicle. To this end there is provided a pressure differential operated clutch and brake actuator comprising a double-ended cylinder 18 housing a reciprocable piston 20, the latter having connected thereto a sleeve member 22 slidable within one end of the cylinder. The cylinder is in fluid transmitting connection with an intake manifold 24 by a conduit 25 and is preferably pivotally secured to a bracket 26, the latter being fixedly secured to the chassis. To the sleeve member there is rigidly secured a collar 28 in which is mounted a pin 30 slidable within a slotted portion of an arm 32 operably connected to a cam member 34. The cam member is rotatably mounted upon an eccentric 36, the latter being pivotally mounted upon a pin 38 fixedly secured to the chassis of the vehicle. The cam 34 is contactible with a roller member 40 mounted upon one end of the clutch operating crank arm 10. That portion of the sleeve member 22 adjacent and secured to the piston 20 constitutes a portion of the control valve mechanism for the pressure differential operated motor, the remaining valve structure comprising a piston 42 slidable within the sleeve.

The piston 42 is operably connected to an accelerator 44 by means of a lever member 45, pivoted intermediate its ends at 45', said lever comprising three arms 46, 48 and 50, the latter arm being operably connected to the piston through the intermediary of links 52 and 54 and a lever member 56. The arm 48 of the lever is slidably mounted over a throttle operating link 58, the latter being operably connected with a butterfly operating crank 60 by a lost motion slotted portion 62. The arm 48 of the aforementioned lever is also adapted to contact a stop 64 secured to the link 58 to thereby provide a means to draw the link to the right against the resistance of a return spring 66 and effect an opening of the throttle. A spring 68 serves to bias the throttle to its closed position.

A brake pedal 70 is pivotally mounted at 72 and is operably connected to the brake operating crank arm 16 by means of links 74 and 76 interconnected by a lost motion connection 78. The connection 78 preferably comprises a pin 78' secured to the link 76 fitting within a slotted portion at the end of the link 74. A pin 80 on the cam 34 is adapted to fit within a hook member 82 secured to the link 76.

Describing now the operation of the above-described mechanism, upon release of the accelerator 44, through the intermediary of an accelerator return spring 84 and the return spring 66, the three-arm lever is rotated counterclockwise. The lever 56 fulcrums at its upper end upon a projection 86 extending from the brake pedal 70, the link 54 being moved to the right to move the valve piston 42 to the right to uncover a port 88 in the sleeve 22. The atmosphere then enters a left compartment 90 of the clutch and brake motor via an opening 92 in the end of the sleeve 22 and a port 88. Inasmuch as a right compartment 94 of the motor is connected to the intake manifold by conduit 25, and therefore evacuated, the piston 20 is subjected to a differential of pressures, resulting in a movement of the piston to the right. With the movement of the piston, the pin 30 serves, through the intermediary of the arm 32, to rotate the cam counterclockwise, thus rotating the clutch operating crank 10 counterclockwise, to the position disclosed in Figure 1, to disengage the clutch. The sleeve 22, which is secured to the piston 20, moves therewith to the right to the valve lapped position disclosed in Figure 1, such movement being subsequent to the movement of the valve piston 22. This operation is known as a follow-up valve action. The flow of air into the compartment 90 is thus cut off, maintaining the clutch disengaged. There is thus provided a follow-up action of the valvular mechanism provided by the piston 42 and the ported sleeve 22.

Should the operator now desire to apply the brakes, he depresses the pedal 70, thereby again moving the valve piston 42 to the right to again uncover the port 88. The motor is thus again energized to rotate the cam to apply the brakes. As previously referred to, the parts are shown in their clutch disengaged position in Figure 1. Accordingly, the pin 80, after the clutch is disengaged, is nested within and in contact with the hook 82. Should the brake pedal be held stationary after an increment of movement, the piston 20 follows up, as previously described, to lap the valve and hold the brakes applied. The brake pedal may be subsequently applied in the same manner to progressively apply the brakes to the degree desired.

The brakes may now be released by either completely or progressively releasing the brake pedal, the valve piston 42 moving to the left, followed by a corresponding movement of the piston 20 to the left under the action of a return spring 95, the movement of the latter being effected by the return springs in the braking mechanism supplemented by a return spring 96 within the cylinder 18 acting on the piston 20.

After the brakes have been released, the clutch may be engaged, either progressively step by step or variably in one complete cycle of operation, by means of the accelerator pedal 44. Release of the pedal, as with a depression of the brake pedal, serves to move the valve piston 42 to the left to uncover the port 88 to thereby interconnect the compartments 90 and 94 to again initiate an equalization of the gaseous pressures within said compartments and thus engage the clutch under the action of its spring. This is the same action as was effected with a release of the brakes, just described. The clutch may thus be progressively engaged, depending upon the degree of movement of the accelerator pedal as the same is depressed. Preferably, the parts are so constructed and arranged that a depression of the accelerator just sufficient to take up the lost motion at the slotted connection 62 serves to bring the clutch plates just into contact one with the other, without however effecting a driving contact. Further depression of the accelerator serves both to open the throttle and to progressively load the clutch plates, depending upon the position of the accelerator, this control being effected by virtue of the follow-up valve mechanism within the actuator. Should the driver either inadvertently or by design, depress the accelerator to a considerable extent, the clutch will nevertheless be engaged in two or more distinct stages, this by virtue of the contour of the cam indicated generally at 98, the contour being such as to provide for a relatively rapid engagement of the clutch up to the point where the clutch plates contact and thereafter a relatively slow or cushioning engagement of the clutch. The cam, which constitutes a leverage changing member, may be contoured depending upon the characteristics of the particular clutch. Normally, however, the engagement of the clutch is progressive by virtue of the follow-up valve action previously described.

Should the driver wish to cut out of operation the power operation of the clutch and brakes, such may be effected by virtue of a Bowden control 100 operating a crank arm 102 secured to the eccentric 36. A sufficient rotation of the eccentric will serve to move the cam 34 clockwise to such a degree that the clutch arm 10 will not disengage the clutch with a movement of the piston 20 upon release of the accelerator. The clutch would then be operated by the conventional clutch pedal, not shown. The links 74 and 76 interconnecting the brake pedal and crank 16 provide a means for operating the brakes manually in the event of failure of the power means.

There is thus provided a compact and efficient power means for operating both the clutch and brakes of the vehicle comprising a single pressure differential operated actuator, both the clutch and brakes being progressively applied, at the will of the driver, by a follow-up control of the actuator. Furthermore, the brakes and clutch may be selectively applied, the clutch being controlled by the accelerator and the brakes by the brake pedal. The mechanism also doubly insures a so-called two-stage engagement of the clutch; that is, a relatively rapid movement of the driving clutch plate up to a position immediately adjacent the driven plate, the remaining clutch plate contacting movement being relatively slow. This slow movement may be determined at will by varying the contour of the cam. Inasmuch as the cam constitutes a leverage changing member, both the distance and rate of movement of the clutch and/or brake operating members 10 and 16 may be varied at will, depending upon the adjustment.

While one illustrative embodiment has been described, it is not my intention to limit the scope of the invention to that particular embodiment, or otherwise than by the terms of the appended claims.

We claim:

1. In an automotive vehicle provided with a clutch, a brake, and a throttle, power means for operating the brake and clutch comprising a vacuum suspended type of power actuator, including a cylinder and a piston, a valve member housed within said piston, means interconnecting said valve member with the accelerator, and means interconnecting said piston with the brakes and clutch comprising a cam member contoured to provide for a variable engagement of the clutch.

2. In an automotive vehicle provided with a clutch and a brake, power means for operating the clutch and brake comprising a cylinder member, a piston member therein, means interconnecting said latter member with the clutch and brakes comprising a sleeve member connected to said piston and slidable within one end of said cylinder member, and an eccentrically mounted clutch and brake operating cam member connected to said sleeve member to provide a means for timing the operation of the clutch and the relative timing of the clutch and brakes.

3. In an automotive vehicle provided with a clutch, power means for operating said clutch including a motor comprising a cylinder and a piston, leverage-changing means interconnecting said piston with said clutch and adapted to effect a variable rate of engagement of the clutch, and a follow-up valve for controlling said motor, whereby the clutch may be controlled either by said follow-up valve to progressively engage the clutch or by said leverage-changing means to automatically simulate a manually controlled engagement of the clutch.

4. In an automotive vehicle provided with controls including a throttle operating accelerator, a brake, and a clutch, power means for operating said brake and clutch including a motor, said motor comprising a double-ended vacuum cylinder and a piston within said cylinder, means interconnecting said piston with said brake and clutch comprising leverage-changing means, a follow-up valve mechanism for controlling the operation of said motor, and two separate manually operable means for independently operating said valve mechanism to successively operate the brakes and the clutch.

5. In an automotive vehicle provided with a clutch and brakes, common power means for operating both the clutch and brakes comprising a pressure differential operated motor, follow-up valve means for controlling the operation of said motor, and means interconnecting said motor and clutch for effecting a two-stage engagement of the clutch.

6. In an automotive vehicle provided with a clutch and brakes, common power means for operating both the clutch and brakes comprising a pressure differential operated motor, follow-up valve means for controlling the operation of said motor to effect an operation of the clutch and a step by step or progressive application and release of the brakes, and leverage-changing means interconnecting said motor and clutch for effecting a two-stage engagement of the clutch.

HAROLD W. PRICE.
OTTO CAPRA.
EARL R. PRICE.